(12) United States Patent
Skubnik et al.

(10) Patent No.: US 8,054,961 B2
(45) Date of Patent: Nov. 8, 2011

(54) MEETME ASSISTANT

(75) Inventors: Bianka Skubnik, Menlo Park, CA (US); Saravanakumar Tiruthani, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1201 days.

(21) Appl. No.: 11/541,232

(22) Filed: Sep. 29, 2006

(65) Prior Publication Data

US 2008/0080699 A1 Apr. 3, 2008

(51) Int. Cl.
*H04M 3/42* (2006.01)

(52) U.S. Cl. .............................. 379/210.01; 379/214.01

(58) Field of Classification Search ............. 379/201.01, 379/214.01, 142.05, 88.19, 88.2, 210.01
See application file for complete search history.

(56) References Cited

U.S. PATENT DOCUMENTS

| | | | | |
|---|---|---|---|---|
| 5,872,841 | A * | 2/1999 | King et al. ............... | 379/210.01 |
| 6,327,343 | B1 * | 12/2001 | Epstein et al. ............. | 379/88.01 |
| 6,961,418 | B1 * | 11/2005 | Thygeson et al. ....... | 379/210.01 |
| 7,076,043 | B2 * | 7/2006 | Curbow et al. .......... | 379/201.06 |
| 7,411,942 | B1 * | 8/2008 | Croak et al. .................. | 370/352 |
| 7,653,380 | B2 | 1/2010 | Graefen | |
| 7,747,752 | B2 * | 6/2010 | Pedersen ....................... | 709/227 |
| 2002/0118807 | A1 * | 8/2002 | Pedersen .................. | 379/142.01 |
| 2004/0028208 | A1 * | 2/2004 | Carnazza et al. ........ | 379/221.01 |
| 2004/0034700 | A1 * | 2/2004 | Polcyn .......................... | 709/223 |
| 2006/0036478 | A1 * | 2/2006 | Aleynikov et al. ............... | 705/8 |
| 2007/0025530 | A1 * | 2/2007 | Tidwell et al. ............. | 379/88.25 |
| 2007/0147596 | A1 * | 6/2007 | Moser ....................... | 379/207.02 |
| 2007/0201668 | A1 * | 8/2007 | Youd et al. ............... | 379/207.03 |
| 2008/0069317 | A1 * | 3/2008 | Campbell et al. .......... | 379/88.22 |

FOREIGN PATENT DOCUMENTS

GB 2362537 A 11/2001

* cited by examiner

*Primary Examiner* — Olisa Anwah

(57) ABSTRACT

In some embodiments, a future availability system may include one or more of the following features: (a) a memory having, (i) a future availability program that allows a caller to obtain future availability information about a call recipient if the caller has been designated by the recipient to have access to the future availability data, (ii) program that notifies the caller through a method chosen by the caller when the call recipient's availability changes (b) a processor coupled to the memory that executes the future availability program, (c) an inference engine located on the memory that stores information about the call recipient.

21 Claims, 6 Drawing Sheets

MEETME ASSISTANT

FIELD OF THE INVENTION

This invention relates to telecommunications systems. In particular, this invention relates to automated assistants. More particularly, this invention relates to the use of presence based communication systems that allows outside parties to discover a user's future availability.

BACKGROUND OF THE INVENTION

Large enterprises receive numerous telephone calls, each of which must be routed in accordance with callers' instructions. Calls typically are routed by a human operator or an automated call routing system (commonly referred to as an "automated attendant" or "autoattendant"). Human operators typically route calls accurately and efficiently, but at a relatively high cost. Autoattendant systems, on the other hand, typically are inexpensive to implement and function very quickly.

Traditionally, autoattendants play an announcement to the caller and prompt a caller to make one of multiple selections using a voice response unit. For example, the caller may be prompted to dial the extension of the party being called. The caller also may be given other options, such as leaving a voice message or accessing a directory of names if the extension of the called party is not known. Some early automated telephone directories required the caller to spell the name of the called party using a telephone dual-tone multifrequency (DTMF) keypad. Most recent autoattendant systems are voice-enabled, allowing callers to be routed to a desired call destination simply by speaking the name of the call destination. In these systems, an autoattendant answers an incoming call and asks the caller to speak the name of the party or department being called. The autoattendant includes a speaker-independent speech recognition engine that identifies and translates a received speech signal into name data. The autoattendant obtains a telephone number corresponding to the translated name data from a telephone number directory based on the translated name data, and routes the call to that telephone number.

Presence-based communications applications are entering the mainstream telecommunications environment. In such applications, a user maintains one or more "contact lists" of other parties whose presence status is to be monitored and displayed to the user. If the other party is determined to be "present," the user's contact list will display the available status. The user can then contact the other party for example via a telephone call.

The existing presence based real-time communication systems allow users to determine how and where to receive incoming calls. Further, users of a presence based communication system are able to obtain another user's future availability with a Tell-Me-When feature which sends a message to the user that the other user is able to be contacted. Outside callers have been able to get a general sense for how to contact an individual at a later time by the call recipient setting an announcement detailing how to get a hold of them at a later time. However, presently, presence based communication systems do not allow for an outside party to obtain a call recipient's future voice or calendar availability. It is possible for a user to leave his(er) future availability in a specific announcement to be given to a caller when they call. However, this must be done manually by the user and must be changed each time the user's future availability changes. Further, this manual system does not account for time zone changes. For example, if the caller is in EST (Eastern Standard Time) and the recipient is in PCT (Pacific Coast Time).

Therefore, it is desirable to have a system that allows a user outside of a presence based telecommunications system to obtain the future availability of a call recipient.

SUMMARY OF THE INVENTION

These and other drawbacks in the prior art are overcome in large part by a system and method according to embodiments of the present invention.

In some embodiments, a future availability system may include one or more of the following features: (a) a memory having, (i) a future availability program that allows a caller to obtain future availability information about a call recipient if the caller has been designated by the recipient to have access to the future availability data, (b) a processor coupled to the memory that executes the future availability program, (c) an inference engine located on the memory that stores information about the call recipient.

In some embodiments, a method for future availability screening may include one or more of the following steps: (a) detecting a call from a caller, (b) determining if the caller qualifies to obtain a recipient's future availability data, (c) determining if the caller would like to obtain the recipient's future availability data, (d) inputting inference engine rule data, (e) transferring the caller to voicemail if they do not qualify to obtain the recipient's future availability data, (f) transferring the call to a future availability assistant if the caller qualifies to obtain the recipient's future data, (g) informing the caller of the recipient's future availability if the caller qualifies to have the recipient's future availability data and desires to have the recipient's future availability data, and (h) determining if the caller would like to initiate a Tell-Me-When action on the recipient to be notified when the recipient is available for conversation.

In some embodiments, a machine readable medium having machine executable instructions may include one or more of the following features: (a) detection instructions that determine an arrival of an incoming call, (b) qualification instructions that determine if a caller has authority to access a call recipient's future availability, (c) access instructions that provide the caller with the call recipient's future availability if the caller has authority to access the call recipient's future availability, and (d) rule instructions that allow the call recipient to input call handling rules including all callers that can have access to the call recipient's future availability.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
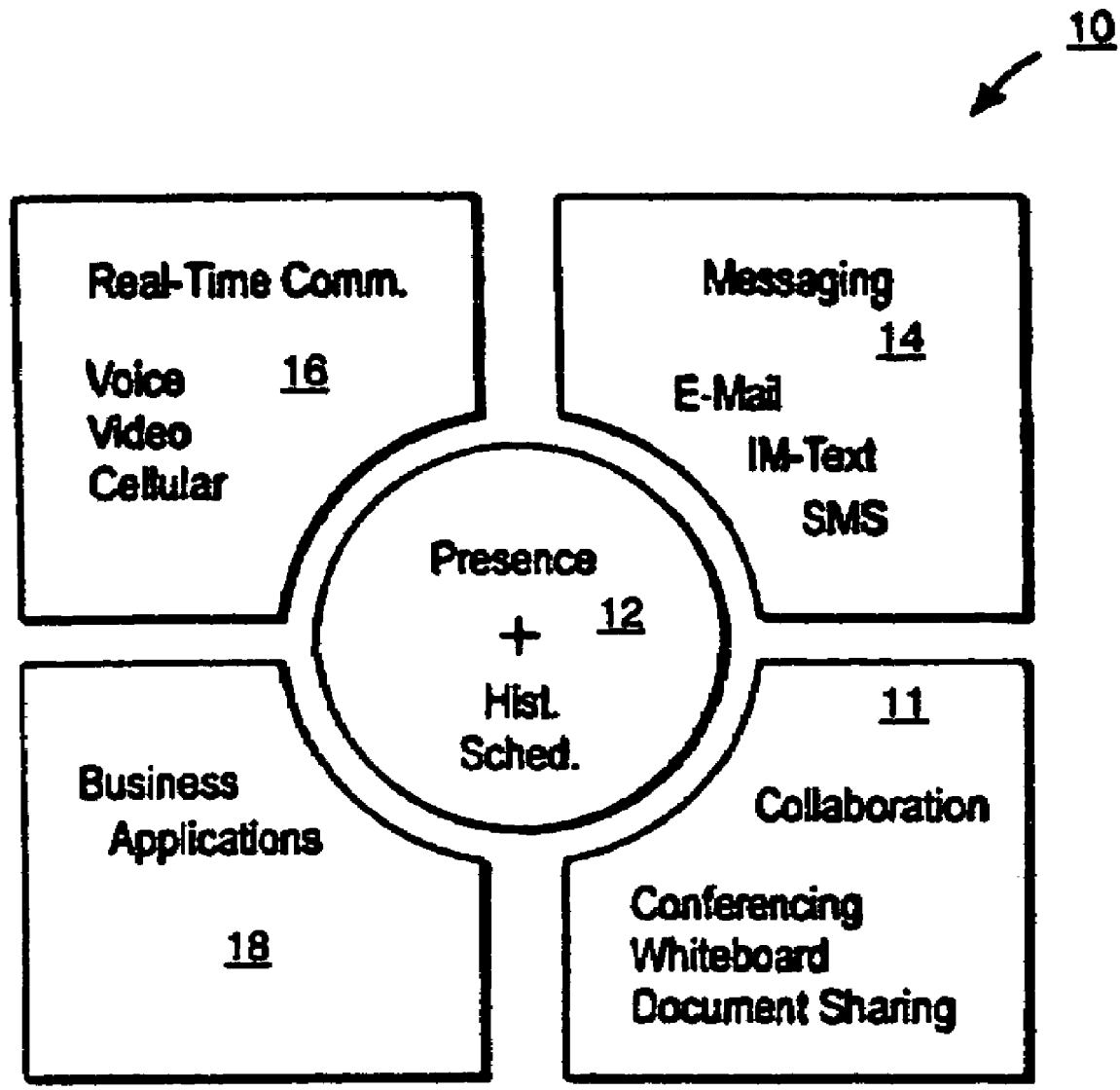
FIG. 1 illustrates a multi-modal presence system according to embodiments of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention disclose a presence based telecommunications assistant that provides outside parties including parties outside of the presence based telecommunications network with a Tell-Me-When callback capability that includes indication of a user's future availability. The assistant would consider all aspects of the user's rules, automation, and calendar information.

Currently, parties external to a presence based telecommunications system do not have the capability to query the future availability of users of the presence based telecommunications system. A "MeetMe" Assistant could allow a presence based telecommunications user to specify who has the privilege to query the user's future information.

"MeetMe" Assistant could have an interface that would accept information from a caller, such as caller interaction using a DTMF keypad or through voice, to enter the name of the user sought. "MeetMe" assistant could also have an inference engine to determine the user's future availability. A future availability could be inferred from the inference engine based upon a user's current presence status, what the user has published in the form of a calendar, and what communication rules the user has configured. Since rules may be assigned individually, access to the future availability can be based on who the requestor is and the relation between the user and the requester. "MeetMe" assistant could also be able to resolve time differentials between the requestor and the user. The assistant could convert the future availability date/time information of the user to the requestor's time zone. Further, a "MeetMe" assistant could be implemented into currently existing personal auto-attendants.

Turning now to the drawings and with particular attention to FIG. 1, a diagram schematically illustrating a multi-modal presence-based telecommunications system 10 according to an embodiment of the present invention is shown. Telecommunications system 10 includes real-time communication capabilities 16, messaging capabilities 14, network business applications 18, and collaboration applications 11. Real-time communication 16 can include, for example, voice, video, or cellular. Messaging 14 includes e-mail, instant messaging, short messaging service (SMS) or other text-based services. Business applications 18 can include, for example, Customer Relationship Management (CRM) and Enterprise Resource Planning (ERP) software packages. Collaboration applications 11 can include conferencing, whiteboarding, and document sharing applications.

In addition, a multi-modal presence feature 12 according to embodiments of the present invention can provide presence services, including history, and scheduling information, aggregated across various media 14, 16, 18, and 11.

It is noted that while illustrated as a multi-modal presence system, embodiments of the present invention are equally applicable to system employing only single presence-based media. Thus, the figures are exemplary only.

Figure 2:
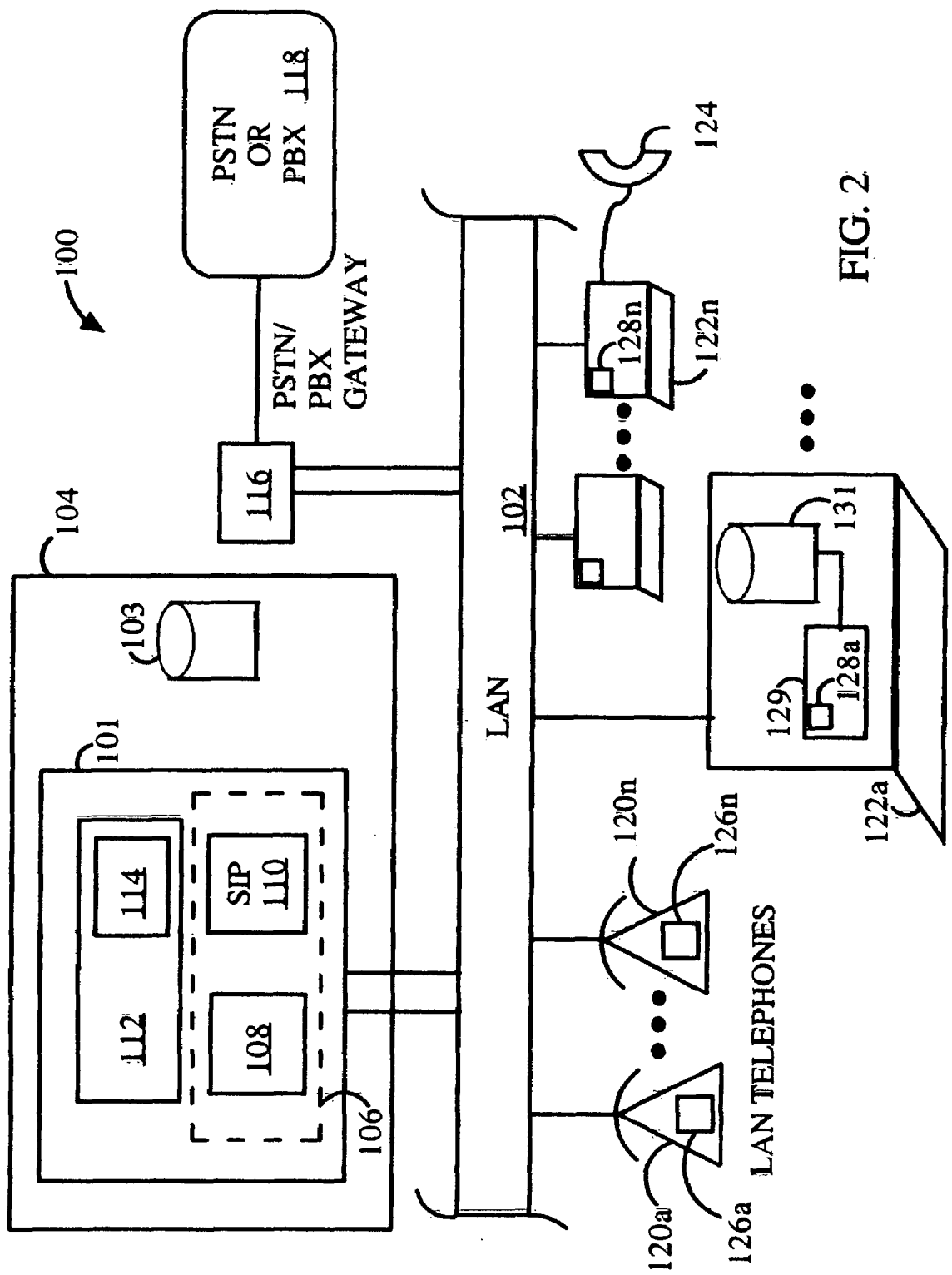
FIG. 2 is a block diagram of a telecommunications system according to an embodiment of the present invention.

Referring now to FIG. 2, a diagram of an exemplary telecommunications or conference system 100 in some embodiments is shown. As shown, system 100 may include a local area network (LAN) 102. LAN 102 may be implemented using a TCP/IP network and may implement voice or multimedia over IP using, for example, the Session Initiation Protocol (SIP). Operably coupled to local area network 102 is a server 104. Server 104 may include one or more controllers 101, which may be embodied as one or more microprocessors, and memory 103 for storing application programs and data. Controller 101 may implement an instant messaging system 106. Instant messaging system 106 may be embodied as a SIP proxy/register and SIMPLE (Session Initiation Protocol for Instant Messaging and Presence Leveraging Extensions) clients or other instant messaging system (Microsoft Windows Messenger™ software) 110. In some embodiments, if possible and practicable, instant messaging system 106 may implement or be part of the Microsoft.Net™ environment and/or Real Time Communications server or protocol (RTC) 108.

In addition, in some embodiments, a collaboration system 114 may be provided, which may be part of an interactive suite of applications 112, run by controller 101. In addition, an action prompt module 115 may be provided, which detects occurrences of action cues and causes action prompt windows to be launched at client devices 122. Collaboration system 114 may allow users of the system to become participants in a conference or collaboration session.

Also coupled to LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to LAN 102. In some embodiments, one or more other types of networks may be used for communication between server 104, computers 122a-122n, telephones 120a-120n, gateway 116, etc. For example, in some embodiments, a communications network might be or include the Internet, the World Wide Web, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. Also, in some embodiments, one or more client devices (e.g., the computers 122a-122n) may be connected directly to the server 104.

The computers 122a-122n may be personal computers implementing the Windows XP™ operating system and thus, Windows Messenger™ instant messenger system, or SIP clients running on the Linux™ or other operating system running voice over IP clients or other clients capable of participating in voice or multimedia conferences. In addition, computers 122a-122n may include telephony and other multimedia messaging capability using, for example, peripheral cameras, Web cams, microphones and speakers (not shown) or peripheral telephony handsets 124, such as the Optipoint™ handset, available from Siemens™ Corporation. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium™ type microprocessors, and storage 131 for applications and other programs.

Finally, computers 122a-122n may implement interaction services 128a-128n in some embodiments. Interaction services 128a-128n may allow for interworking of phone, buddy list, instant messaging, presence, collaboration, calendar and other applications. In addition, interaction services 128 may allow access to the collaboration system or module 114 and action prompt module 115 of server 104.

Figure 3:
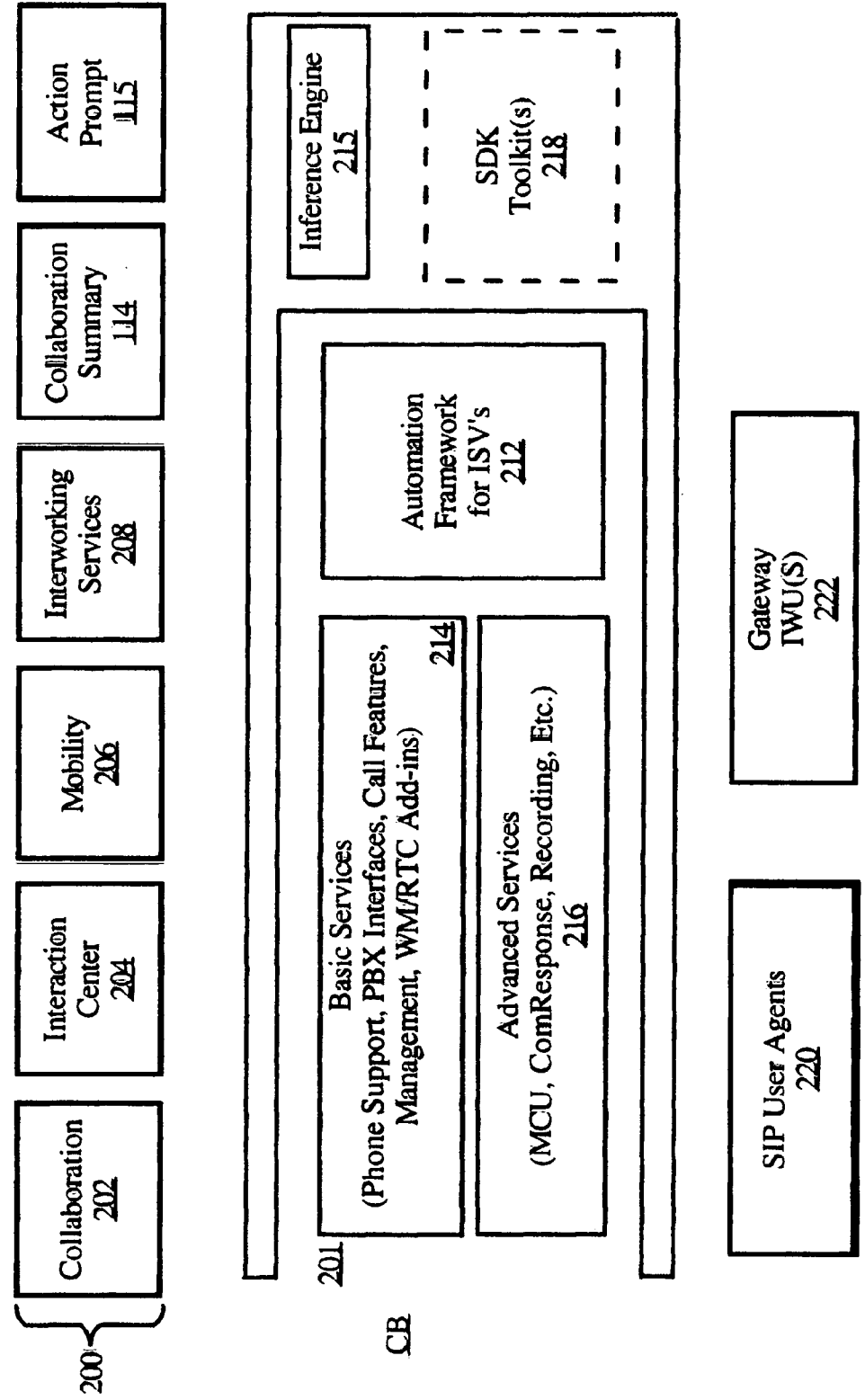
FIG. 3 is a block diagram of a multimedia server according to embodiments of the present invention.

Turning now to FIG. 3, a functional model diagram illustrating collaboration system 114 is shown. More particularly, FIG. 3 is a logical diagram illustrating a particular embodiment of a collaboration server 104. Server 104 includes a plurality of application modules 200 and a communication broker (CB) module 201. One or more of the application modules and communication broker module 201 may include an inference engine 215, i.e., a rules or heuristics based artificial intelligence engine for implementing functions in some embodiments. Interference engine 215 is discussed in more detail below. In addition, server 104 provides interfaces, such as APIs (application programming interfaces) to SIP phones or other SIP User Agents 220 and gateways/interworking units 222.

According to the embodiment illustrated, broker module 201 includes a basic services module 214, an advanced services module 216, an automation module 212, and a toolkit module 218. Automation module 212 implements an automation framework for ISVs (independent software vendors) 212 that allow products, software, etc. provided by such ISVs to be used with or created by server 104.

Basic services module 214 functions to implement, for example, phone support, PBX interfaces, call features and management, as well as Windows Messaging™ software and RTC add-ins, when necessary. The phone support features allow maintenance of and access to buddy lists and provide presence status.

Advanced services module 216 implements function such as presence, multipoint control unit or multi-channel conferencing unit (MCU), recording, and the like. MCU functions are used for voice conferencing and support ad hoc and dynamic conference creation from a buddy list following the SIP conferencing model for ad hoc conferences. In certain embodiments, support for G.711, G.723.1, or other codecs is provided. Further, in some embodiments, the MCU can distribute media processing over multiple servers using the MEGACO/H.248 protocol Presence features provide device context for both SIP registered devices and user-defined non-SIP devices. Various user contexts, such as In Meeting, On Vacation, In the Office, etc., can be provided for. In addition, voice, e-mail, and instant messaging availability may be provided across the user's devices. The presence feature enables real time call control using presence information, e.g., to choose a destination based on the presence of a user's device(s). In addition, various components have a central repository for presence information and for changing and querying presence information. In addition, the presence module provides a user interface for presenting the user with presence information.

In addition, broker module 201 may include the ComResponse™ platform, available from Siemens Information and Communication Networks™, Inc. The ComResponse™ platform features include speech recognition, speech-to-text, and text-to-speech, and allows for creation of scripts for applications. The speech recognition and speech-to-text features may be used by collaboration summarization unit 114 and action prompt module 115.

In addition, real time call control is provided by a SIP API 220 associated with basic services module 214. That is, calls can be intercepted in progress and real time actions performed on them, including directing those calls to alternate destinations based on rules and or other stimuli. SIP API 220 also provides call progress monitoring capabilities and for reporting status of such calls to interested applications. SIP API 220 also provides for call control from the user interface.

Toolkit module 218 may provide tools, APIs, scripting language, interfaces, software modules, libraries, software drivers, objects, etc. that may be used by software developers or programmers to build or integrate additional or complementary applications.

According to the embodiment illustrated, the application modules include a collaboration module 202, an interaction center module 204, a mobility module 206, an interworking services module 208, a collaboration summarization module 114, and an action prompt module 115.

Collaboration module 202 allows for creation, modification or deletion of a collaboration or conference session for a group of participants or other users. Collaboration module 202 may further allow for invoking a voice conference from any client device. In addition, the collaboration module 202 can launch a multi-media conferencing package, such as the WebEX™ package. It is noted that the multi-media conferencing can be handled by other products, applications, devices, etc.

Interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

Mobility module 206 provides for message forwarding and "one number" access across media, and message "morphing" across media for the subscriber. Further, various applications can send notification messages to a variety of destinations, such as e-mails, instant messages, pagers, and the like. In addition, a user can set rules that mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, collaboration summarization module 114 is used to identify or highlight portions of a multimedia conference and configure the portions sequentially for later playback. The portions may be stored or identified based on recording cues either preset or settable by one or more of the participants in the conference, such as a moderator. The recording cues may be based on vocalized keywords identified by the voice recognition unit of the ComResponse™ module, or may be invoked by special controls or video or whiteboarding or other identifiers.

The action prompt module 115 similarly allows a user to set action cues, which cause the launch of an action prompt window at the user's associated client device 122. In response, the client devices 122 can then perform various functions in accordance with the action cues.

Figure 4:
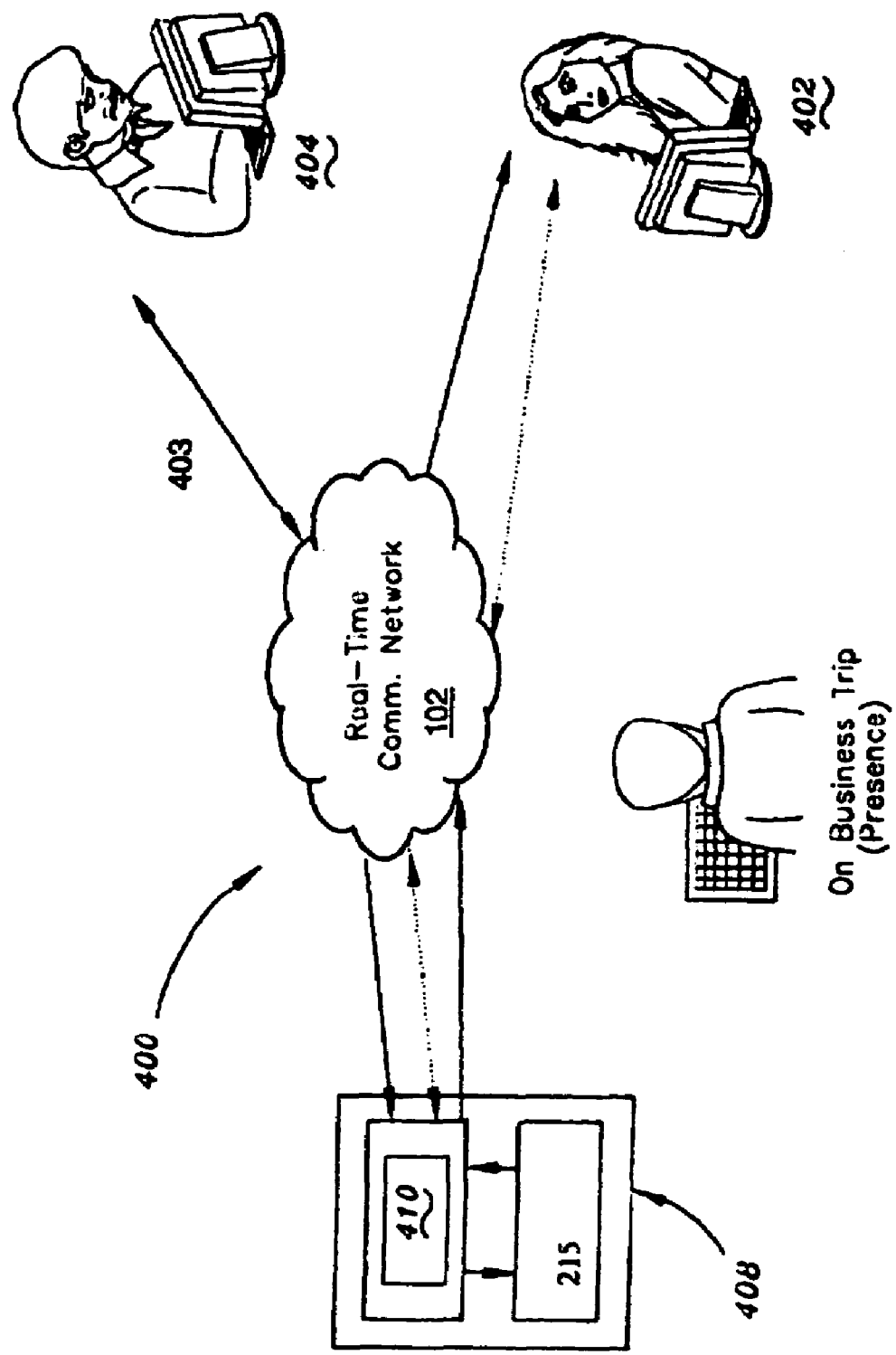
FIG. 4 shows a future availability assistant system operation in embodiments of the present invention.

With reference to FIG. 4, one implementation of a future availability assistant system in an embodiment of the present invention is shown. Future availability assistant system 400 is described with the following example. Jane 402 has her presence status set to "On business trip". Therefore to all presence based telecommunications users it will appear as if Jane 402 is not in the office. Further, to all outside parties they will be unable to contact Jane 402 as she is on a business trip. For outside parties Jane 402 may leave a message on her voicemail indicating she is currently unavailable on a business trip. Embodiments of the present invention disclose just how all parties (inside and outside) could find out when is the next time they could contact Jane 402 or set up a Tell-Me-When function with Jane's assistant to contact the parties the next time Jane was available for conversation.

Jane 402 can interact with network 102. Jane 402 may be any entity that may be associated with presence information, including a human being, an electronic device, a computer program, or other entity. Jane 402 may have one or more presence states that may be relative to one or more endpoints. Table 1 shows examples of presence states and descriptions of the presence states.

TABLE 1

| Presence State | Description |
| --- | --- |
| 'Available' | The subscriber is in the office and available to receive messages. |
| 'On the Phone' | The subscriber is in the office, but is on the phone. |
| 'In Office' | The subscriber is in the office. |
| 'Be Right Back' | The subscriber is in the office but is not available. |
| 'In Meeting' | The subscriber is in the office but is not available because they are in a meeting. |
| 'On Business Trip' | The subscriber is not in the office and is not available to receive messages. |
| 'Out of Office' | The subscriber is not in the office and is not available to receive messages. |
| 'On Vacation' | The subscriber is not available to receive messages. |
| 'No Interruptions' | The subscriber is in the office but is not available to receive messages. |
| 'Working Remotely' | The subscriber is working and available, but not in the office. |
| 'Unknown' | It is not known whether the subscriber is available. |

The presence states shown in Table 1 may be applicable to an individual subscriber. The states above are exemplary. Different presence systems can have different states. Embodiments of the present invention can be easily adapted to the states available in a particular presence system. The presence states may also be applicable to other entities, including aggregate entities such as workgroups, group mailboxes or group phone connections. For example, a presence state may reflect the availability of a group of customer service representatives in a complaint department. When no representative is available to handle the call, the associated presence state may be 'On the Phone'. The presence information may reflect the availability of at least one member of the group, or may reflect other presence information applicable to the group as a whole.

Jack 404 may not be a presence based telecommunications user or he could simply be an outside party to network 102. However, Jack 404 may be a presence based telecommunications user. For purposes of the following description Jack 404 is described as being an outside third party to presence based network 102. Embodiments of the present invention disclose a way for the presence state communicated for an individual to be set to different values for specific recipients of that presence information. It is noted that a user has the ability to select certain individual(s) or group(s) of contacts to present their presence differently then to others. This can be controlled by rules or other presence influencing parameters. So, for example a user might want to indicate to their direct reports and their manager to be available even though they are "busy" in a meeting which is the presence indication to other users. This may not only influence their presence status seen by other users, but can also influence the real-time communication handling when others try to reach the user. The handling of the incoming communication may in this case get handled differently for the user's direct reports and manager versus other users. These rules can be set using a graphical user interface where the user makes their selections as to presence status but also as to who can see the presence status as well as other items such as calendar data.

Jack 404 is dealing with an important and urgent matter and needs to talk with Jane 402 so Jack 404 chooses to call 403 Jane 402. Upon receiving Jack's call Jane's personal assistant 408 answers the call. Personal assistant 408 could be located on server 104 or on Jane's computer 122. Future availability engine 410 could then initiate a conversation with Jack 404 to ascertain if Jack would like to initiate a Tell-me-when callback and/or obtain indication of Jane's future availability. The engine's communication with Jack 404 could be by email, IM, SMS, pop-up display message or similar visual indication, or by voice using text to speech software. In its simplistic form, future availability engine 410 prompts Jack 404 to specify whether he would like to initiate a Tell-Me-When callback and/or have an indication as to Jane's future availability. The Tell-Me-When feature would allow engine 410 to notify Jack 404 when Jane 402 is available to be contacted. The indication into Jane's future availability would allow Jack to see Jane's future availability based upon Jane's rules, calendar information, etc. all set within inference engine 215.

Jack 404 would be allowed to request a Tell-Me-When feature or access to Jane's future availability through gateway 222. Through gateway 222 future availability engine 410 can prompt Jack 404 to select a Tell-Me-When callback feature and/or request Jane's future availability. Alternatively, future availability engine 410 can engage Jane 402 with an IM (instant messaging) session thus allowing Jane 402 to intervene and influence whether Jack 404 can have access to Jane's future availability. After ascertaining Jack's preferences be it Tell-Me-When and/or Jane's future availability, future availability engine 410 can store Jack's Tell-Me-When request in memory 103 and/or access inference engine 215 to discover Jane's future availability. Rules, for the purpose of this disclosure, will take the real-time presence information of, for example, other users that have been assigned by the user as their delegates, user location & time-zone, device/media capability, calendar context and other user definable conditions in consideration to determine what options are being offered to the caller and how to most effectively deal with the call for further processing/routing. Future availability engine 410 also accounts for Jack's time zone. For example, if Jack is in the Eastern Time Zone (ETZ) and Jane is in the Pacific Time Zone (PTZ), future availability engine 410 will discover Jane's future availability in pacific time and add four hours so that Jack can see Jane's availability in eastern time.

Figure 5:
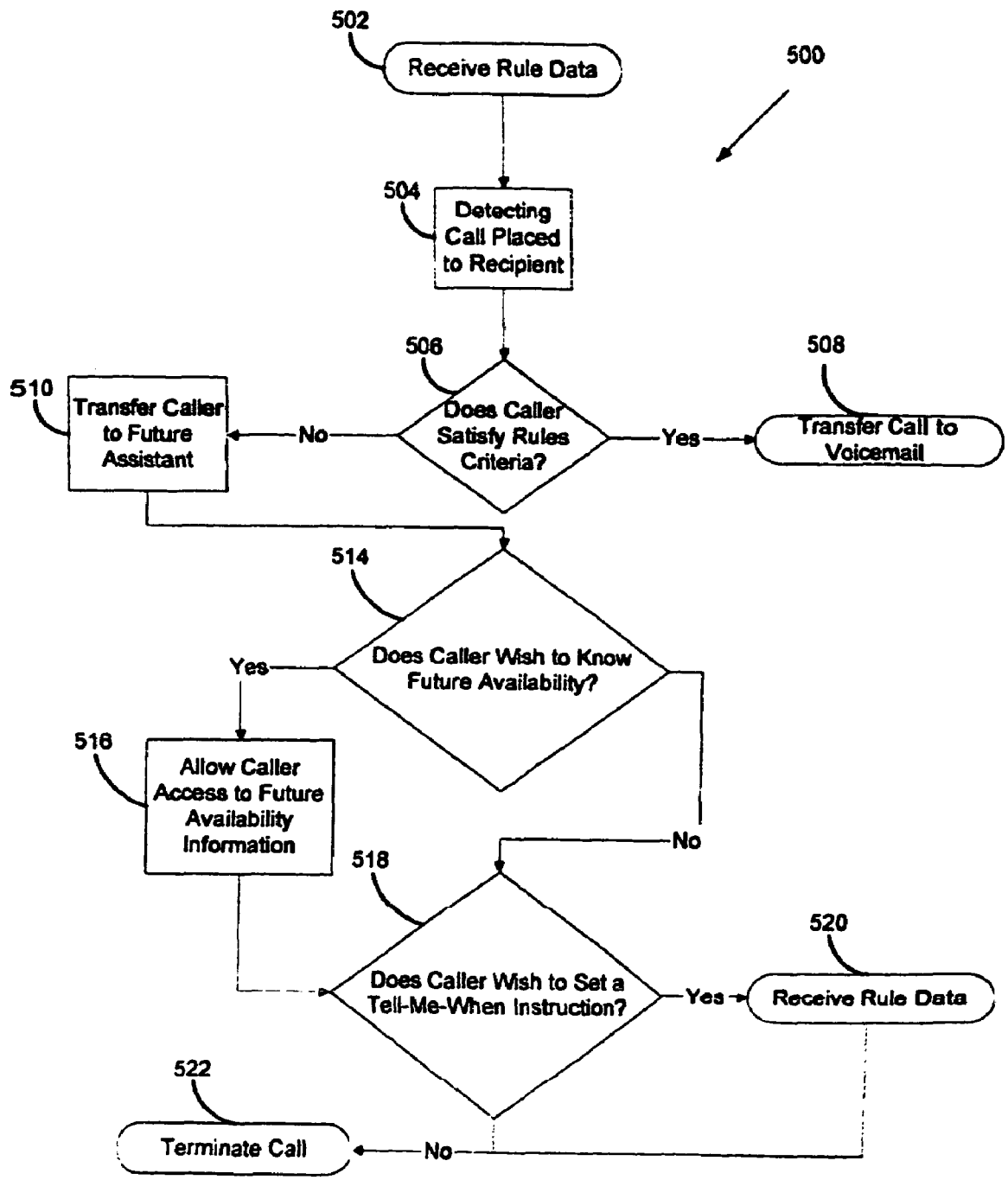
FIG. 5 is a flow chart diagram of a future availability assistant system according to embodiments of the present invention.

With reference to FIG. 5, a flow chart diagram of a future availability system according to embodiments of the present invention is shown. It is fully contemplated that other implementations of a future availability system 400 could be implemented without departing from the spirit of the invention. At state 502 a user such Jane 402 could input their future availability handling rules 412 that are received by future availability assistant 408. These rules could be entered either directly (inputting presence and calendar information) or indirectly (being on the phone). Preferences could also include a list of phone numbers which can have access to future availability data. Inside rules 215 a user can also set how the caller will interact with assistant 408. For example, the recipient could instruct future availability engine 410 to obtain information directly from the caller before determining if the caller can have access to future availability information.

At state 504, program 500 detects that a call has been placed to the recipient. At state 506 program 500 determines if the caller satisfies initial criteria for access to the recipient's future availability information. If the caller does not have authorization to the recipient's future availability or is not allowed to set a Tell-Me-When action then engine 410 would forward the caller to voicemail at state 508. If a caller is on the caller's list of people to have access to future availability information or allowed to set a Tell-Me-When action, the caller is transferred to future availability engine 410 at state 510. Future availability engine 410 determines if the caller would like to know the recipient's future availability at state 514. If the caller does not wish to know the recipient's future availability, then engine 410 proceeds to ask the caller if they would like to set a Tell-Me-When action for the recipient at state 518. If the caller does wish to know the recipient's future availability, then engine 410 proceeds to state 516 where engine 410 relays the future availability to the caller. As stated above, the engine's communication with the caller could be by email, IM, SMS, pop-up display message or similar visual indication, or by voice using text to speech software, or through a callback which can be determined by the recipient. The callback option will result in a call being placed automatically between the two parties, once the called party's presence state change triggers the option specified by the caller. E.g., if the caller had specified callback option on voice availability, the caller would receive a callback as soon as the called party's voice presence status becomes available After the caller is given the recipient's future availability, program 500 proceeds to state 518 where the caller is given the option to also set a Tell-Me-When action for the recipient. If the caller does not wish to initiate a Tell-Me-When action, then program 500 can terminate the call or as an alternative offer the caller the opportunity to leave a voice message at state 522. If the caller would like to initiate a Tell-Me-When action, program 500 can proceed to state 520 where engine 410 can accept Tell-Me-When rule data from the caller. This rule data could include a way for engine 410 to contact the caller when the recipient is available for conversation. The caller could specify the option based on the specific voice availability status of the called party, change in the voice availability status, specific present state (e.g. ON VACA-TION) and present state change (e.g. any change from ON_VACATION). Once the caller is finished, program 500 could then proceed to state 522 where the call could be terminated or the caller could leave a voice message.

Figure 6:
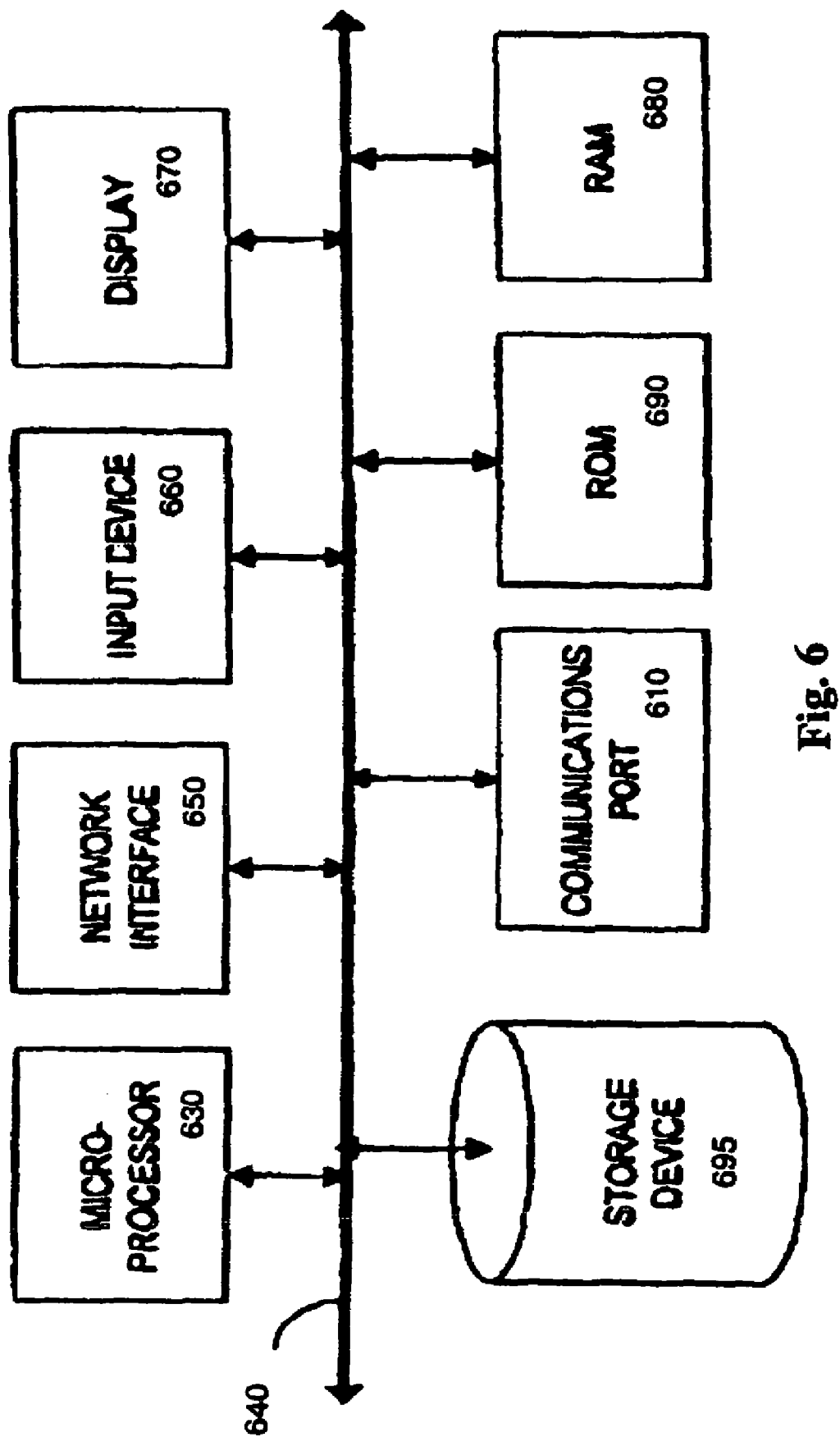
FIG. 6 is a block diagram of the internal architecture of a computing device according to some embodiments of the invention.

FIG. 6 is a representative block diagram of a computing device according to some embodiments. It is understood computing device 104 or 122 could be used to execute program 500 described above. Computing device 104 may comprise a single device or computer, a networked set or group of devices or computers, such as a workstation, laptop etc. Computing device 104 is typical of a data session-capable machine. Computing device 104 can include a microprocessor 630 in communication with communication bus 640. Microprocessor 630 is used to execute processor-executable process steps so as to control the components computing device 104 to provide functionality according to embodiments of the present invention. Microprocessor 630 may comprise a Pentium™, or Itanium™ microprocessor manufactured by Intel™ Corporation. Other suitable processors may be available from Motorola™, Inc., AMD™, or Sun Microsystems™, Inc. Microprocessor 630 also may comprise one or more microprocessors, controllers, memories, caches and the like.

Input device 660 and display 670 are also in communication with communication bus 640. Any known input device may be used as input device 660, including a keyboard, mouse, touch pad, voice-recognition system, or any combination of these devices. Input device 660 may be used by a user to input information and commands and select a rules for inference engine 215.

Display 670 may be an integral or separate CRT display, a flat-panel display or the like. Display 670 is generally used to output graphics and text to an operator in response to commands issued by microprocessor 630. Display 670 may display presentation data and the like which is used during the future availability process.

RAM (Random Access Memory) 680 is connected to communication bus 640 to provide microprocessor 630 with fast data storage and retrieval. In this regard, processor-executable process steps being executed by microprocessor 630 are typically stored temporarily in RAM 680 and executed therefrom by microprocessor 630. ROM (Read Only Memory) 690, in contrast, may provide storage from which data can be retrieved but to which data cannot be stored. Accordingly, ROM 690 may be used to store invariant process steps and other data, such as basic input/output instructions and data used during system boot-up or to control input device 660. One or both of RAM 680 and ROM 690 may communicate directly with microprocessor 630 instead of over communication bus 640, or on separate dedicated busses.

Data storage device 695 stores, among other data, processor-executable process steps of future availability program 500 discussed with respect to FIGS. 4 and 5. The process steps and program code of program 500 and the like may be read from a computer-readable medium, such as a floppy disk, a CD-ROM, a DVD-ROM, a Zip™ disk, a magnetic tape, or a signal encoding the process steps/program code, and then stored in data storage device 695 in a raw, compressed, un-compiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 650 which may be a wired or wireless Ethernet interface, a modem interface, and so on. In utilizing the various embodiments of the invention, the network interface 650 may be connected to or to provide or access a high-speed connection to the Internet or an Intranet providing access to the Internet or similar networks. Using such a network or networks, computing device 104 can communicate identifiers of destination parties to a mobile application server.

Stored in data storage device 695 may also be other elements that may be necessary for operation of computing device 104, such as other applications, other data files, a network server, an operating system, a database management system and "device drivers" for allowing microprocessor 630 to interface with external devices. These elements are known to those skilled in the art, and are therefore not described in detail herein.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A future availability system comprising:
    a callee device;
    wherein the callee device detects a call from a caller;
    wherein the callee device determines if the caller has access to future availability information of a user of the callee device, the future availability information comprising calendar information for the user with time slots in which the user is available and at least one media type in which the user is available, the at least one media type comprising at least one of electronic mail, instant messaging, telephone, and mobile phone; and
    wherein if the callee device determines that the caller does not have access to the future availability information, the callee device forwards the caller to a voicemail messaging system;
    wherein the future availability information is determined based on presence information of the user's assigned delegates, the user's location and time zone, the user's device and media capability, and the user's presence state.

2. The system of claim 1, further comprising an inference engine located in the callee device, and wherein the inference engine determines the future availability information.

3. The system of claim 2, wherein the callee device is a personal computer or a Session Initiation Protocol ("SIP") phone.

4. The system of claim 1, wherein the callee device determines whether the caller would like to receive the user's future availability information or initiate an automatic callback if the callee device determines that the caller has access to the user's future availability information; and
    if the caller requests to receive the recipient's future availability information, the callee device provides the user's future availability information in a specified type of communication to the caller, the specified type of communication being specified by the caller; and
    if the caller requests to initiate the automatic callback, the callee device receives a specified presence state trigger from the caller to initiate the automatic callback to the caller, the automatic callback comprises a call being placed automatically to the caller when the user's presence state matches the specified presence state trigger.

5. The system of claim 1, wherein the future availability information provided to the caller is determined based on future availability handling rules that are entered by the user directly.

6. The system of claim 1, wherein the presence state of the user for determining future availability is dependent upon a relationship between the user and the caller.

7. The system of claim 6, wherein the presence state of the user comprises an availability of at least one member of a group of customer service representatives.

8. A method for future availability screening, the method comprising the steps of:
    a callee device detecting a call from a caller;
    the callee device determining if the caller has access to a call recipient's future availability information, the future availability information comprising calendar information for the call recipient with time slots in which the call recipient is available and at least one media type in which the call recipient is available, the at least one media type comprising at least one of electronic mail, instant messaging, telephone and mobile phone; and
    the callee device forwarding the caller to a voicemail messaging system if the callee device determines that the caller does not have access to the future availability information; and
    wherein the future availability information depends on presence information of the call recipient's assigned delegates, the call recipient's location and time zone, the call recipient's device and media capability, and the call recipient's presence state.

9. The method of claim 8, further comprising the callee device determining whether the caller would like to obtain the call recipient's future availability information or initiate an automatic callback if the callee device determines the caller has access to the future availability information;
    the callee device providing the call recipient's future availability information in a type of communication to the caller if the callee device determines the caller would like to receive the recipient's future availability information; and
    the callee device receiving a specified presence state trigger from the caller to initiate the automatic callback if the callee device determines that the caller would like to initiate an automatic callback.

10. The method of claim 9, further comprising the caller specifying the type communication in which the call recipient's future availability information is provided.

11. The method of claim 8, wherein the callee device is a personal computer or SIP phone.

12. The method of claim 8, wherein the presence state of the call recipient that is used to determine future availability information is dependent upon a relationship between the call recipient and the caller.

13. The method of claim 8, wherein the presence state of the call recipient comprises presence information that comprises an availability of at least one member of a group of customer service representatives.

14. A non-transitory machine readable medium comprising machine executable instructions, comprising:
    detection instructions that determine an arrival of an incoming call;
    qualification instructions that determine if a caller has authority to access a call recipient's future availability information; and access instructions that provide the caller with the call recipient's future availability information if the caller has authority to access to the call recipient's future availability; and wherein if the caller is determined to have access to the future availability information, the access instructions initiate a communication with the caller to determine whether the caller will initiate an automatic callback or will request to receive the call recipient's future availability; and wherein if the caller requests to the receive the future availability information, the future availability information provided to the caller depends on future availability handling rules, the future availability handling rules are based on presence information of the call recipient's assigned delegates, the call recipient's location and time zone, the call recipient's device and media capability, and the call recipient's presence state; and wherein if the caller does not have access to the future availability information, the access instructions forward the caller to a voicemail messaging system; and wherein the non-transitory computer readable medium is located in a callee device.

15. The medium of claim 14, further comprising an inference engine that calculates the future availability information, the inference engine being stored in the non-transitory computer readable medium in the callee device.

16. The medium of claim 14, wherein callee device is a personal computer or an SIP phone.

17. The medium of claim 16, wherein the callee device receives a specified presence state trigger from the caller to initiate the automatic callback to the caller, the automatic callback comprises a call being placed automatically to the caller when the call recipient's presence state matches the specified presence state trigger.

18. The medium of claim 14, wherein the future availability information is determined based on rule instructions that are entered by the call recipient directly.

19. The medium of claim 14, wherein the presence state of the call recipient that is used to determine future availability information is dependent upon a relationship between the call recipient and the caller.

20. The medium of claim 14 wherein the presence state of the call recipient comprises presence information that reflects an availability of at least one member of a group of customer service representatives.

21. A future availability system comprising:
a callee device having a future availability program, a memory, and a processor;
wherein the future availability program provides future availability information about a call recipient to a caller if the caller has been designated by the call recipient to have access to the future availability information; and
wherein the future availability program communicates with the call recipient to determine whether the caller has access to the future availability information; and
wherein the future availability information comprises calendar information for the call recipient with time slots in which the call recipient is available, a presence context of the call recipient, and at least one media type in which the call recipient is available; and
wherein the at least one media type including electronic mail, instant messaging, telephone, and mobile phone; and
wherein the processor coupled to the memory executes the future availability program stored in the memory; and
wherein the future availability information is determined based on the call recipient's assigned delegates, location and time zone, device and media capability, calendar information, and presence state.

* * * * *